United States Patent
Rodgers et al.

(10) Patent No.: US 6,517,776 B1
(45) Date of Patent: Feb. 11, 2003

(54) UV OXYGEN SCAVENGING INITIATION IN ANGULAR PREFORMED PACKAGING ARTICLES

(75) Inventors: Brad D. Rodgers, Orange, TX (US); Ta Yen Ching, Novato, CA (US); Gary D. Jerdee, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 09/705,658

(22) Filed: Nov. 3, 2000

(51) Int. Cl.$^7$ .............................. A61L 2/00; B01J 19/08; A61N 5/00; G01J 1/00; B05C 5/00
(52) U.S. Cl. .............................. 422/24; 422/21; 422/28; 422/186.05; 422/292; 422/302; 422/304; 250/492.1; 250/504 R; 118/317
(58) Field of Search ................ 250/453.11, 454.11, 250/455.11, 341.1, 1, 21, 22, 24, 26, 27, 28, 106.05, 492.1, 504 R; 422/292, 302, 304, 492.1; 118/323, 317

(56) References Cited

U.S. PATENT DOCUMENTS

| | | | |
|---|---|---|---|
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 4,683,701 A | * 8/1987 | Rangwala et al. | 53/426 |

(List continued on next page.)

FOREIGN PATENT DOCUMENTS

| | | | |
|---|---|---|---|
| DE | 2 914 075 A1 | | 4/1979 |
| EP | 1020363 A2 | | 7/2000 |
| JP | 01226529 A | * | 9/1989 |
| WO | WO98/05571 | | 7/1997 |
| WO | WO98/05703 | | 7/1997 |
| WO | WO99/21698 | | 5/1999 |
| WO | WO-99/48963 | * | 9/1999 |
| WO | WO 02/12067 | | 2/2002 |

OTHER PUBLICATIONS

"Tasteless Oxygen Scavenging Polymers: A New Platform Technology for Food Packaging Based on Controlled Oxidation," Ching et al., presented at Future–Pak Conference, Chicago, IL (Jun. 19, 2000).
"Tasteless Oxygen Scavenging Polymers," Ching et al., Future–Pak Conference, Chicago IL (Jun. 19, 2000).
PCT/US01/32373 International Search Report (Mar. 15, 2002).

*Primary Examiner*—Robert J. Warden, Sr.
*Assistant Examiner*—Imad Soubra
(74) *Attorney, Agent, or Firm*—Williams, Morgan & Amerson, P.C.

(57) ABSTRACT

Methods and systems are disclosed for initiating oxygen scavenging in an angular preformed packaging article comprising an oxygen scavenging layer. The packaging article is moved into and out of a chamber, in which it is exposed to UV radiation of at least about 280 nm. The wavelength of UV radiation to which the article is exposed can be selected so that it will be absorbed by the oxygen scavenging layer as efficiently as possible, taking into account the composition of the oxygen scavenging layer and any additional layers that are present.

67 Claims, 3 Drawing Sheets

U.S. PATENT DOCUMENTS

| | | | |
|---|---|---|---|
| 5,034,235 A | 7/1991 | Dunn et al. | 426/238 |
| 5,116,916 A | 5/1992 | Young | 525/350 |
| 5,135,014 A * | 8/1992 | Beswick | 118/317 |
| 5,211,875 A | 5/1993 | Speer ket al. | 252/188.28 |
| 5,346,644 A | 9/1994 | Speer et al. | 252/188.28 |
| 5,425,896 A | 6/1995 | Speer et al. | 252/188.28 |
| 5,433,920 A * | 7/1995 | Sizer et al. | 422/22 |
| 5,466,756 A | 11/1995 | Roach et al. | 525/330.6 |
| 5,498,364 A | 3/1996 | Speer et al. | 252/188.28 |
| 5,606,169 A | 2/1997 | Hiller et al. | 250/455.11 |
| 5,627,239 A | 5/1997 | Ching et al. | 525/330.6 |
| 5,641,825 A | 6/1997 | Bacskai et al. | 524/398 |
| 5,648,020 A | 7/1997 | Speer et al. | 252/188.28 |
| 5,656,692 A | 8/1997 | Hayes | 525/63 |
| 5,660,761 A | 8/1997 | Katsumoto | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,809,740 A | 9/1998 | Sundby et al. | 53/167 |
| 5,811,027 A | 9/1998 | Speer et al. | 252/188.28 |
| 5,837,158 A | 11/1998 | Shepodd et al. | 252/181.6 |
| 5,859,145 A | 1/1999 | Ching et al. | 525/330.6 |
| 5,904,960 A | 5/1999 | Becraft et al. | 427/588 |
| 5,911,910 A | 6/1999 | Becraft et al. | 252/188.28 |
| 5,920,075 A | 7/1999 | Whitehead | 250/492.1 |
| 5,962,860 A | 10/1999 | Trokhan et al. | 250/504 |
| 6,037,598 A | 3/2000 | Cicha | 250/455.11 |
| 6,056,918 A | 5/2000 | Palaniappan et al. | 422/24 |
| 6,057,013 A | 5/2000 | Ching et al. | 428/35.7 |
| 6,063,307 A | 5/2000 | Shepodd et al. | 252/181.6 |

* cited by examiner

UV OXYGEN SCAVENGING INITIATION IN ANGULAR PREFORMED PACKAGING ARTICLES

BACKGROUND OF THE INVENTION

1. Field of the Invention

The present invention relates generally to the field of oxygen scavenging packaging. More particularly, it concerns methods and systems for initiating oxygen scavenging in an angular preformed packaging article comprising an oxygen scavenging layer.

2. Description of Related Art

It is well known that limiting the exposure of oxygen-sensitive products to oxygen maintains and enhances the quality and shelf life of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging.

Another means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passing through the walls of the package (herein referred to as an "active oxygen barrier"), thereby maintaining the lowest possible oxygen level throughout the package. The oxygen passing through the walls may come from outside of the package or may come from inside the package.

In many cases, however, the onset of oxygen scavenging in this system may not occur for days or weeks. The delay before the onset of useful oxygen scavenging is hereinafter referred to as the induction period. Much work has been done to minimize the induction period.

Speer et al., U.S. Pat. No. 5,211,875, discloses a method for minimizing the induction period by initiating oxygen scavenging via exposure of the oxygen scavenging packaging article to radiation. The radiation can comprise UV or visible light of any wavelength from about 200 nm to about 700 nm, but preferably comprises a wavelength from about 200 nm to about 400 nm. Ching et al., U.S. Pat. No. 5,859,145, also discloses the use of UV or visible light of any wavelength from about 200 nm to about 750 nm, preferably about 200 nm to about 400 nm.

It is desirable to be able to initiate oxygen scavenging in an angular preformed packaging article that comprises an oxygen scavenging layer by exposing the interior of the packaging article to UV radiation. However, it is difficult to achieve uniform UV treatment of the interior surfaces of certain preformed, angular oxygen scavenging packaging articles with a simple UV radiation source disposed above the packaging article. Examples of such angular preformed packaging articles are gable-top cartons; parallelepiped cartons, plastic bottles, and glass bottles, among other containers. The problem of achieving relatively uniform UV exposure can become even more difficult if there is at least one non-oxygen scavenging layer between the interior of the package and the oxygen scavenging layer.

A need exists for improved methods for initiating oxygen scavenging in angular preformed packaging articles.

SUMMARY OF THE INVENTION

The present invention is directed to methods and systems for initiating oxygen scavenging in an angular preformed packaging article that comprises an oxygen scavenging layer.

One aspect of the invention is a method for initiation of oxygen scavenging in an angular preformed packaging article that comprises sidewalls, wherein the sidewalls comprise an oxygen scavenging layer. The sidewalls of the packaging article define a hollow interior and have an inner surface. The packaging article is moved into a chamber that comprises a UV exposure apparatus, and at least one of the packaging article or the UV exposure apparatus are moved relative to the other, such that at least a part of the UV exposure apparatus is positioned in the hollow interior of the packaging article. UV radiation of at least about 280 nm is emitted from the UV exposure apparatus, such that the radiation contacts the inner surface of the sidewalls of the packaging article, in a dose sufficient to initiate oxygen scavenging in the oxygen scavenging layer.

In one particular embodiment of the method, the UV exposure apparatus comprises a UV source and a member that is extendable and retractable. The member is extended to position the UV source in the hollow interior of the packaging article, where the source emits UV radiation toward the inner surface of the sidewalls. The member can subsequently be retracted.

In another particular embodiment, the UV exposure apparatus comprises a UV source and a lift mechanism. The lift mechanism moves the angular preformed packaging article such that at least a part of the UV source is positioned in the hollow interior of the packaging article, where the source emits UV radiation toward the inner surface of the sidewalls.

In yet another particular embodiment, the UV exposure apparatus comprises a UV source and a reflector apparatus for reflecting UV radiation emitted by the UV source toward the inner surface of the packaging article. The reflector apparatus is retractable and extendable. It is extended to position the reflector in the hollow interior of the packaging article. In that position, UV radiation emitted toward the reflector is then reflected toward the inner surface of the sidewalls.

In still another particular embodiment, the UV exposure apparatus comprises a UV source, a reflector apparatus for reflecting UV radiation emitted by the UV source toward the inner surface of the packaging article, and a lift mechanism for moving the packaging article relative to the reflector, such that at least a part of the reflector becomes positioned in the hollow interior of the packaging article. UV radiation is emitted from the UV source, which is reflected by the reflector toward the inner surface of the packaging article.

Another aspect of the present invention is an oxygen scavenging initiation system that comprises: (a) an angular preformed packaging article as described above; (b) a conveying apparatus for moving the packaging article into a chamber that comprises a UV exposure apparatus that emits UV radiation of at least about 280 nm; and (c) a mechanism for moving at least one of the packaging article or the UV exposure apparatus relative to the other, such that at least a part of the UV exposure apparatus is positioned in the hollow interior of the packaging article.

Examples of angular preformed packaging articles comprising an oxygen scavenging layer that can be used in the present invention include gable-top cartons, parallelepiped cartons, cups, trays, and bottles. Such angular preformed packaging articles can further comprise other layers in addition to the oxygen scavenging layer.

The oxygen scavenging layer preferably comprises an oxidizable organic compound and a photoinitiator. Examples of preferred classes of photoinitiators for use in the present invention include benzophenone derivatives containing at least two benzophenone moieties and long-wavelength UV-absorbers.

It is preferred that a UV source be selected that emits UV radiation of at least about 280 nm and at a wavelength that is optimal for absorption by the photoinitiator present in an oxygen scavenging angular preformed packaging article, leading to efficient initiation of oxygen scavenging. However, this is not always possible in practice. When the oxygen scavenging layer or certain additional layers between the oxygen scavenging layer and the hollow interior of the packaging article comprise a partially or wholly UV opaque material, the wavelength of light used should be chosen both to penetrate to and activate the oxygen scavenger. For example, when the oxygen scavenging layer comprises polyethylene terephthalate (PET), wavelengths of UV radiation greater than about 320 nm that can be absorbed by the photoinitiator should be used, as PET is opaque to shorter wavelengths of UV radiation.

As stated above, it is preferred that penetrating UV radiation of optimal wavelength for absorption by the photoinitiator present in the oxygen scavenging layer be used. When this condition is satisfied, the present invention has the advantage of maximum harvesting of the energy of the UV radiation for initiation of oxygen scavenging, thus requiring less energy input or shorter exposure times than methods known in the art. Furthermore, coupling of preferred photoinitiators in the oxygen scavenging layer of the packaging article with exposure to their optimal UV wavelength for absorption, will allow for relatively lower levels of photoinitiator to be used in the packaging article. Since photoinitiators are typically high in cost, the present invention can in some cases reduce the cost of the oxygen scavenging packaging article.

The angular preformed oxygen scavenging packaging article of the present invention is exposed to UV radiation while it passes through a chamber. Exposure of workers to UV radiation is prevented or minimized by the chamber walls. Further, the preferred wavelengths of UV radiation of the present invention (from about 280 nm to about 400 nm) are less harmful than UV radiation of certain shorter wavelengths that have been used in some previous methods of initiating oxygen scavenging in packaging. The duration of UV radiation exposure of the interior surfaces of the angular preformed packaging article should be chosen to be sufficient to achieve the desired level of oxygen scavenging initiation in the packaging article.

In addition to being used to initiate oxygen scavenging in the packaging article, the UV radiation exposure optionally can be such as to sterilize the interior surfaces of the angular preformed packaging article. Furthermore, UV radiation exposure of the interior surfaces of the angular preformed packaging article can be combined with a preceding step of wetting the interior surfaces with hydrogen peroxide. Such hydrogen peroxide wetting with subsequent UV irradiation may improve the efficiency of either initiation of oxygen scavenging or sterilization of the interior surfaces of the packaging article or both. The initiation methods and systems of the present invention can also be combined with methods of sterilizing angular preformed packaging articles (such as chemical, heat, steam, and irradiation methods).

The present invention may further comprise exposing the packaging article to a heat source which maintains its temperature at about 20° C. to about 50° C. while it is being treated with UV radiation to enhance initiation of oxygen scavenging.

The angular preformed packaging article of the present invention can be exposed to UV radiation for a fixed amount of time, and in such a way that the oxygen scavenging layer is relatively uniformly activated to the desired level. By bringing the oxygen scavenging layer and the UV radiation source into the necessary proximity to achieve relatively uniform activation of the oxygen scavenging layer, the present invention provides advantages over merely irradiating the article from above.

Activation of oxygen scavenging in some embodiments of the present invention can be achieved with low intensity UV radiation, thereby minimizing damage to the packaging article and maintaining safety for workers.

BRIEF DESCRIPTION OF THE DRAWINGS

The following drawings form part of the present specification and are included to demonstrate certain aspects of the present invention. The invention may be better understood by reference to one or more of these drawings in combination with the detailed description of specific embodiments presented herein.

DESCRIPTION OF ILLUSTRATIVE EMBODIMENTS

When this patent application mentions "angular preformed packaging article", this is intended to include packaging articles that have been preformed at least to the extent that they comprise formed sidewalls defining a hollow interior. In certain embodiments, an "angular preformed packaging article" can comprise the formed bottom in addition to the sidewalls.

It should further be understood that when this patent application mentions "UV radiation", this is intended to refer to electromagnetic radiation with wavelengths between about 1 nm and 400 nm.

In addition, "penetrating" radiation as mentioned in this patent application refers to electromagnetic waves which can be transmitted through or into a layer of the angular preformed packaging article (e.g. the oxygen scavenging layer or certain additional layers). Certain types of layers may be "opaque" to certain wavelengths of radiation. For example, if a layer is comprised of polyethylene terephthalate, UV radiation of less than 320 nm can not readily pass into or through the layer.

"Interior surfaces" of the angular preformed packaging article in the present application are meant to refer to surfaces that, when the packaging article is filled with a product, are partially or wholly in contact with the product.

The present invention addresses certain problems that are involved in initiating oxygen scavenging in an angular preformed packaging article. If a simple UV lamp is placed in close proximity above an angular preformed packaging article, such as a gable-top carton blank, the level of UV radiation that reaches various points on the interior surfaces of the container is limited by several factors. The total light flux entering the container is restricted to radiation that can be directed through the carton opening, which in the case of typical gable-top cartons is often 55 mm×55 mm, 70 mm×70 mm, or 95 mm×95 mm. Unreflected radiation emitted from a line source UV lamp decreases in intensity with the square of the distance from the UV radiation source. Thus, as the depth of the carton increases, the radiation intensity falls off. In the case of a single UV lamp source above the center of a 70 mm×70 mm×250 mm parallelepiped container, the effective radiation intensity at the bottom of the carton would be reduced to about 15% or less of the maximum intensity.

Another problem with UV treatment of such containers is that the UV radiation enters the top of the container and radiates toward the bottom substantially parallel to the sides of the container. The photoinitiation effect of the radiation that impinges on the sides is very low because of the high angle of incidence. Thus, the sides of the container are the most difficult surfaces to UV activate, especially for tall containers.

Figure 1:
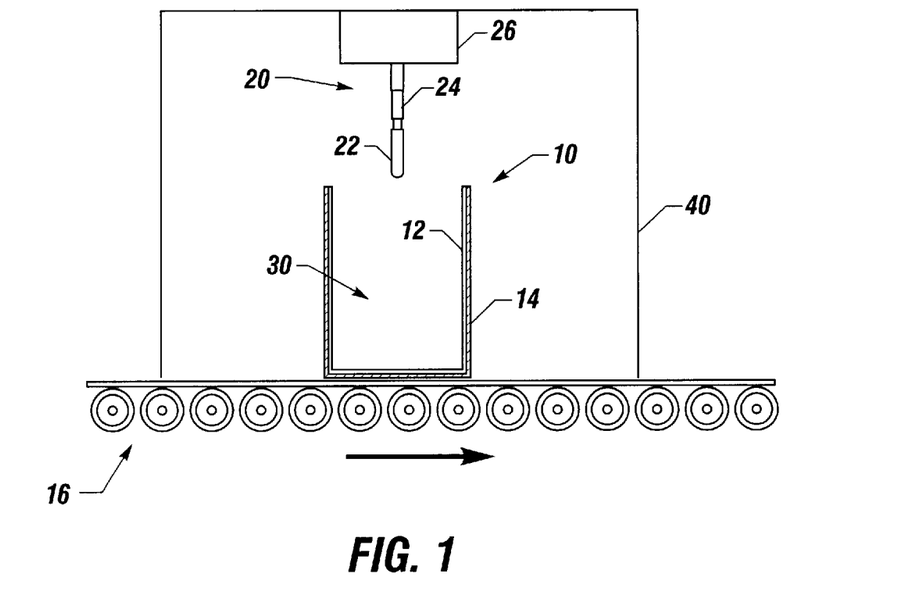
FIGS. 1–5 are schematics, shown in a side elevational view, of systems for initiating oxygen scavenging in an angular preformed packaging article that comprises an oxygen scavenging layer.

FIGS. 1–5 show various embodiments of an oxygen scavenging initiation system of the present invention. In FIG. 1, a gable-top container 10 comprises an inner oxygen scavenging layer 12 and an outer structural layer 14. In FIG. 1, the bottom of the gable-top container has already been formed and sealed but the top has not yet been closed and sealed. However, it should be understood that the present invention does not necessarily require prior closure of the bottom of the container. The container 10 is carried on a conventional conveyor apparatus 16 in the direction of the horizontal arrow in FIG. 1. At one point in its path, the conveyor apparatus carries the container 10 under a UV light exposure apparatus 20. This apparatus 20 comprises a UV light source 22, preferably having a vertical longitudinal axis and emitting UW radiation of at least about 280 nm, a member 24 attached to the source that is vertically extendable and retractable, and an electric motor 26 for driving the extension and retraction of the member 24 and the UV source 22.

Figure 2:
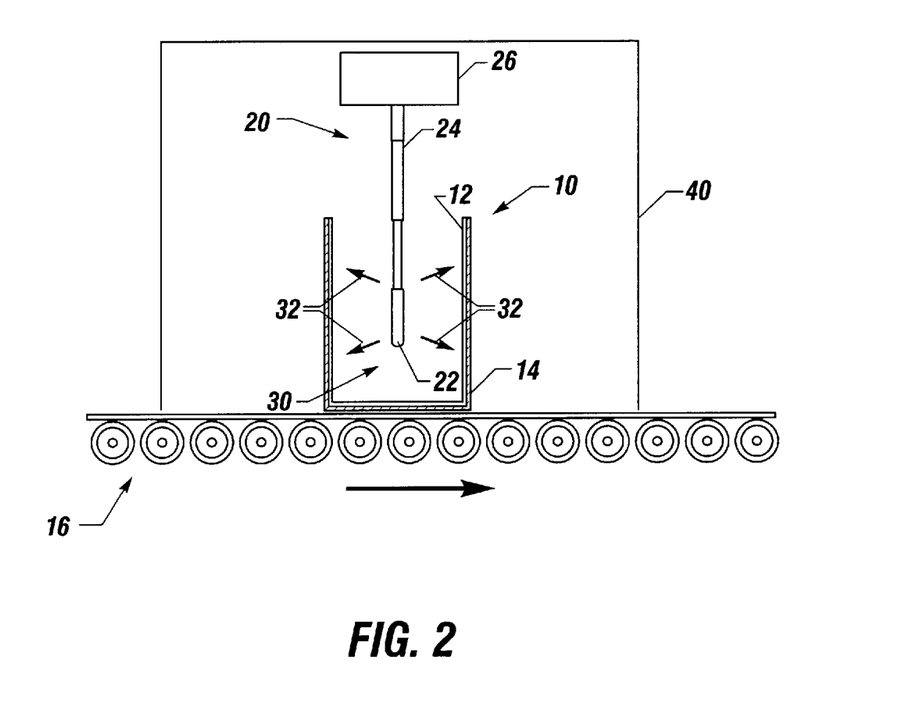

The UV source 22 is initially in the upper (retracted) position, as shown in FIG. 1. When the conveying apparatus 16 causes the container 10 to pass directly underneath the source 22, the motor 26 and the member 24 move the source 22 downward to the position shown in FIG. 2, such that the source is located at least partially, and preferably entirely, within the hollow interior 30 of the gable-top container 10. The UV source emits UV radiation 32 of the desired wavelength (e.g. preferably at least about 280 nm). The radiation 32 contacts the inner surface of the container 10, and if the oxygen scavenging composition is in the innermost layer, as shown in FIGS. 1 and 2, initiates oxygen scavenging. After the desired dose of UV radiation is provided, the UV source is retracted to the position shown in FIG. 1 so the container can continue along the conveyer apparatus.

The present invention preferably makes use of conveyer apparatus that pauses periodically, to allow the container 10 to remain in a fixed horizontal position for a short time while the desired UV exposure occurs, before the container begins moving horizontally along the conveying apparatus path again.

In other embodiments of the invention, the container 10 might contain one or more layers between the oxygen scavenging layer and the interior of the container. In such embodiments, the nature of those inner layers and the dose and wavelength of the UV radiation are such that the UV radiation penetrates those layers to the extent necessary to reach the oxygen scavenging layer and thereby initiate oxygen scavenging.

The apparatus will typically also include a housing or shield 40 to prevent workers in the vicinity from being exposed to the UV radiation. Such UV-opaque housings are well known in the packaging industry.

The UV exposure apparatus shown in FIGS. 1 and 2 can be inserted into a conventional packaging apparatus, for example in-between the apparatus that forms a carton blank into the open carton configuration and the apparatus that fills the carton with food or beverage. Thus, the manufacturing process could comprise the steps of feeding a carton blank to the manufacturing apparatus, forming the blank into a shape having a rectangular cross-section, forming and sealing the bottom of the carton, exposing the interior of the carton to UV radiation using the present invention, filling the carton with food or beverage, and then sealing the top of the carton. This is only one possible configuration. Persons skilled in the packaging art will recognize that other arrangements would be possible.

Figure 3:
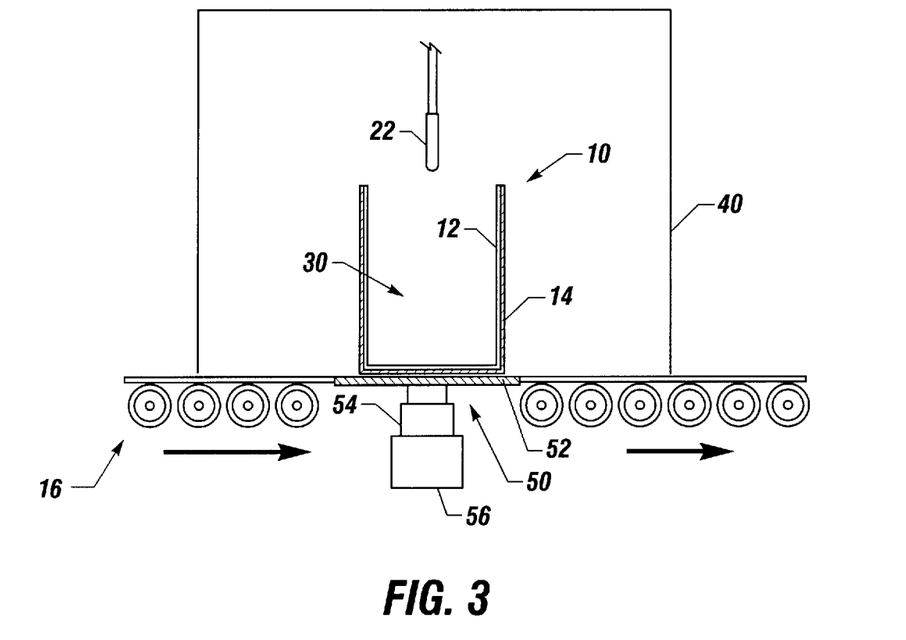
Figure 4:
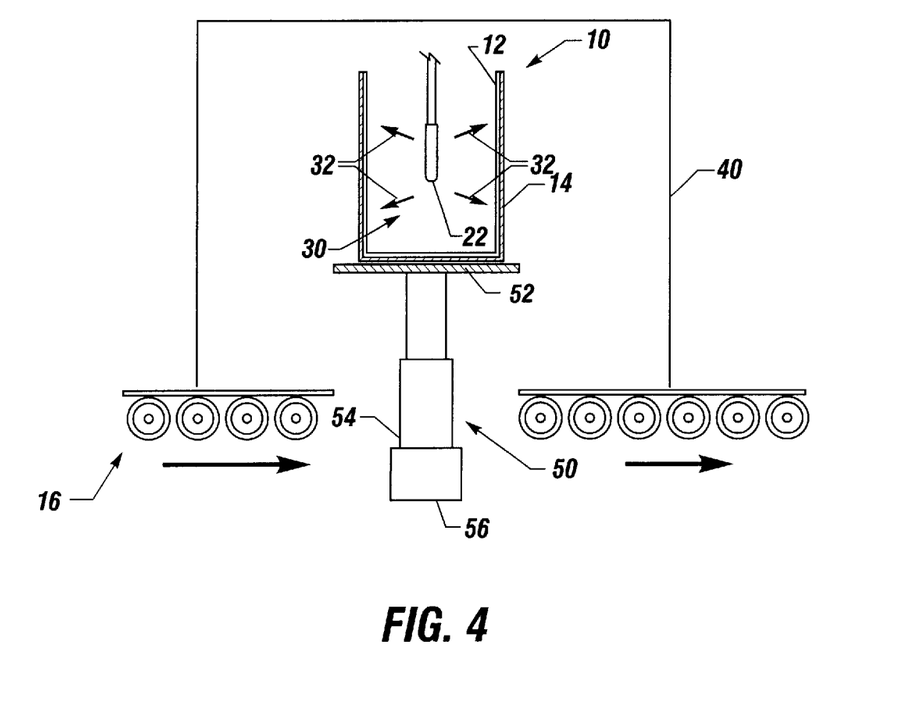

FIG. 3 shows an alternate embodiment using a different type of conveying apparatus 16. In this embodiment, the UV source 22 is fixed, and the conveying apparatus moves the container 10 upward toward the UV source. In particular, the conveying apparatus 16 moves the container in the direction shown by the horizontal arrow. When the container is positioned directly under the source 22, a lift mechanism 50 raises the container. The lift mechanism 50 comprises a lift plate 52, a member 54 that is vertically extendable and retractable, and an electric motor 56 to drive the member 54. When the container 10 is in the desired horizontal position, the lift mechanism raises it to the position shown in FIG. 4, whereby the UV source 22 is positioned in the hollow interior 30 of the container. The source emits UV radiation 32 of the desired wavelength that is at least about 280 nm to initiate oxygen scavenging. After the inner surface of the container receives the desired dose of UV radiation, the lift mechanism 50 can retract, so the container can continue along the conveyer apparatus.

Although FIGS. 1–4 depict embodiments in which either the UV source or the container are moved toward the other, it should be understood that moving both the container and the UV source toward each other is also possible in the present invention. Any combination of movement of the two structures can be used, as long as the result is positioning of the UV source at least partially within the hollow interior of the container.

Figure 5:
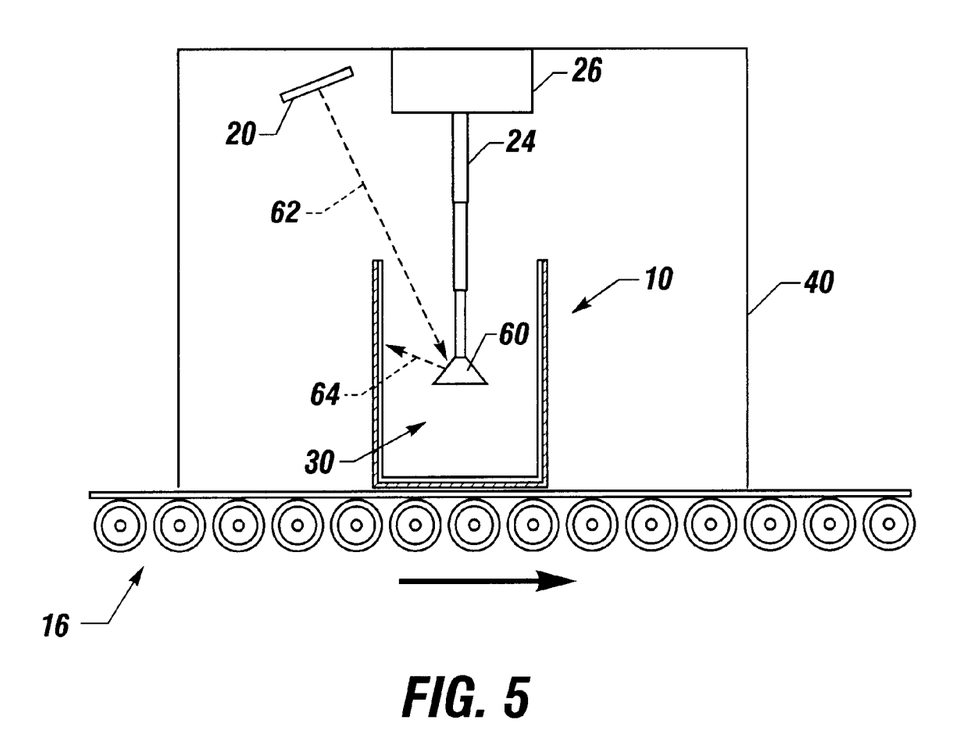

FIG. 5 shows yet another embodiment of the invention, which uses a stationary UV source 22 and a movable reflector 60. The reflector is extended and retracted by a member 24 and motor 26 as previously described. When the reflector is inserted into the hollow interior 30 of the container, UV radiation 62 from the UV source 22 will contact the reflector 60 and reflected radiation 64 will contact the interior walls of the container 10. Again, it would be possible to move the container and keep the reflector stationary, or move both the reflector and the container toward each other.

Although the embodiments of FIGS. 1–5 show either the packaging article moving upward, or the UV source or reflector moving downward, it should be understood that the frame of reference is relative. It is also possible to move one or both in non-vertical directions, as long as the UV radiation is directed against the inner surface of the sidewalls of the package article. Therefore, the use of terms such as "lift" or "downward" should not be read to imply that movement can only be in a vertical direction.

A method of the present invention for initiating oxygen scavenging in an angular preformed packaging article can include the steps of providing such a packaging article that comprises sidewalls defining a hollow interior, the sidewalls having an inner surface, wherein the sidewalls comprise an oxygen scavenging layer; moving the packaging article into a chamber that comprises a UV exposure apparatus; moving at least one of the packaging article or the UV exposure apparatus relative to the other, such that at least a part of the UV exposure apparatus is positioned in the hollow interior of the packaging article; and emitting UV radiation from the UV exposure apparatus such that the radiation contacts the inner surface of the sidewalls of the packaging article, in a dose sufficient to initiate oxygen scavenging in the oxygen scavenging layer.

Examples of angular preformed packaging articles that might be used in this method include gable-top cartons, parallelepiped cartons, trays, cups, and bottles, among other containers. Materials that may be used in making such containers include paper, cardboard, fiberboard, glass or plastic. Such containers may be used as juice cartons, soft drink containers, tofu containers, and beer bottles, among other uses. Such angular preformed packaging articles used in embodiments of the present invention comprise an oxygen scavenging layer. Typically, packaging articles of the present invention have wall thicknesses in the range of 100 to 1000 micrometers. While the oxygen scavenging layer can be an integral component of such angular preformed packaging articles of the present invention, it can also be used in additional non-integral oxygen-scavenging components or layers of the packaging article, e.g., the non-integral oxygen scavenging layer can be in the form of a coating, a bottle cap liner, an adhesive or a non-adhesive sheet insert, a gasket, a sealant, or a fibrous mat insert, among others.

The angular preformed packaging article comprising the oxygen scavenging layer can be used to package any product for which it is desirable to inhibit oxygen damage during storage, e.g. foods, beverages, cosmetics, pharmaceuticals, medical products, corrodible metals, or electronic devices, among others.

The angular preformed packaging article comprising the oxygen scavenging layer can comprise a single layer or multiple layers, e.g. a scavenging layer and additional layers. Such packaging articles can be made by a number of different methods that are known to those skilled in the art. For example, oxygen scavenging single layer angular preformed packaging articles can be prepared by blow molding (i.e. stretch, injection, extrusion, and reheat). Oxygen scavenging angular preformed packaging articles with multiple layers can be prepared using blow molding, coating, or lamination, among other methods. For example, folding and sealing of a precut and prescored material comprising an oxygen scavenging layer may be used to assemble oxygen scavenging cartons.

When an angular preformed packaging article comprises an oxygen scavenging layer and further comprises one or more additional layers, one or more of the additional layers can comprise an oxygen barrier layer, i.e. a layer having an oxygen transmission rate equal to or less than 100 cubic centimeters per square meter ($cc/m^2$) per day per atmosphere at room temperature (about 25° C.), preferably no greater than about 50, more preferably no greater than about 5, most preferably no greater than about 0.5. Typical oxygen barriers comprise poly(ethylene vinylalcohol), polyacrylonitrile, polyvinyl chloride, poly(vinylidene dichloride), polyethylene terephthalate (PET), oriented PET, silica, foil, polyamides, or mixtures thereof.

Other additional layers of the oxygen scavenging packaging article may include one or more layers which are permeable to oxygen. In one embodiment of the present invention, a packaging article might be comprised of the following layers, in order, starting from the outside of the packaging article to the innermost layer (forming the hollow interior) of the packaging article, (i) a structural layer, (ii) an oxygen barrier layer, (iii) an oxygen scavenging layer, and optionally, (iv) an oxygen-permeable seal or food-contact layer. Control of the oxygen barrier property of (ii) allows regulation of the scavenging life of the package by limiting oxygen ingress from the atmosphere to the scavenging layer (iii), and thus slows the consumption of oxygen scavenging capacity by atmospheric oxygen. Layer (iv) can improve the heat-sealability, clarity, or resistance to blocking of the multi-layer packaging article. Also, control of the oxygen permeability of layer (iv) allows alteration of the rate of oxygen scavenging for the overall structure independent of the composition of the scavenging component (iii). Layer (iv) may permit oxygen from the headspace inside the package to pass to the oxygen scavenging layer (iii), while acting as a barrier to migration of the components of the scavenging layer, or by-products of scavenging, into the package interior.

Additional layers, such as adhesive layers, may also be used in a multi-layer packaging article. Suitable compositions for use in adhesive layers include anhydride fuctional polyolefins and other well-known adhesive materials.

The oxygen scavenging layer of the angular preformed packaging article comprises an oxidizable organic compound. The oxidizable organic compound is a hydrocarbon with a polymeric backbone. The hydrocarbon can be saturated or unsaturated, and substituted or unsubstituted. Examples of such hydrocarbons include, but are not limited to, diene polymers such as polyisoprene, polybutadiene, and copolymers thereof, e.g. styrene-butadiene. Such hydrocarbons also include polymeric compounds such as polypentenamer, polyoctenarner, and other polymers prepared by olefin metathesis; diene oligomers such as squalene; and polymers or copolymers derived from dicyclopentadiene, norbornadiene, 5-ethylidene-2-norbomene, or other monomers containing more than one carbon-carbon double bond (conjugated or non-conjugated). These hydrocarbons further include carotenoids such as β-carotene.

Examples of substituted hydrocarbons include, but are not limited to, those with oxygen-containing moieties, such as esters, carboxylic acids, aldehydes, ethers, ketones, or alcohols. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from allyl (meth)acrylates, or polymers containing nitrogen, such as nylon or MXD6, among others.

Preferably, the oxidizable organic compound comprises a polymeric backbone and at least one cyclic olefinic pendant group. More preferably, the polymeric backbone comprises a substantially saturated hydrocarbon polymeric backbone and at least one cyclic olefinic pendant group. The polymeric backbone can comprise monomers of ethylene or styrene. More preferably, the polymeric backbone is ethylenic. A substantially saturated hydrocarbon backbone comprises no more than about 0.1% carbon-carbon double bonds, preferably less than about 0.01%, and most preferably the backbone is 100% saturated.

More preferably, the cyclic olefinic pendant group has the structure (I):

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen.

One preferred oxidizable organic compound is ethylene/vinyl cyclohexene copolymer (EVCH).

In some embodiments, the oxidizable organic compound comprises linking groups linking the backbone with the pendant groups. For example, the linking groups can be selected from:

$-O-(CHR)_n-$; $-(C=O)-O-(CHR)_n-$; $-NH-(CHR)_n-$; $-O-(C=O)-(CHR)_n-$; $-(C=O)-NH-(CHR)_n-$; or $-(C=O)-O-CHOH-CH_2-O-$;

wherein R is hydrogen, methyl, ethyl, propyl, or butyl; and n is an integer from 1 to 12, inclusive.

Preferred examples of such oxidizable organic compounds are ethylene/methyl acrylate/cyclohexenyl methyl acrylate terpolymer (EMCM) or cyclohexenylmethyl acrylate (CHAA) homopolymer.

The oxygen scavenging layer can also comprise a mixture of two or more oxidizable organic compounds as described above. The amount of oxidizable organic compound may range from 1 to 99%, preferably from 10 to 99%, by weight of the oxygen scavenging layer.

Preferably, the oxygen scavenging layer of the present invention further comprises a photoinitiator, or a blend of different photoinitiators. Suitable photoinitiators are well known to those skilled in the art. Specific examples include, but are not limited to, benzophenone, o-methoxybenzophenone, acetophenone, o-methoxyacetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl-ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation. However, due to the high cost of photoinitiators, it is desirable to use the minimum amount of photoinitiator required to initiate oxygen scavenging. This minimum amount will vary depending on the photoinitiator used, the wavelength and intensity of ultraviolet radiation used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in EDI).

One class of photoinitiators that are especially useful in the present invention includes benzophenone derivatives containing at least two benzophenone moieties, as described in copending U.S. patent application Ser. No. 08/857,325, filed May 16, 1997. These compounds act as effective photoinitiators to initiate oxygen scavenging activity in oxygen scavenging compositions. Such benzophenone derivatives have a very low degree of extraction from oxygen scavenging compositions, which may lead to reduced contamination of a packaged product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides. The benzophenone derivatives include dimers, trimers, tetramers, and oligomers of benzophenones and substituted benzophenones.

The benzophenone photoinitiators are represented by the formula:

$$X_m(Y)_n$$

wherein X is a bridging group selected from sulfur; oxygen; carbonyl; $-SiR_2-$, wherein each R is individually selected from alkyl groups containing from 1 to 12 carbon atoms, aryl groups containing 6 to 12 carbon atoms, or alkoxy groups containing from 1 to 12 carbon atoms; $-NR'-$, wherein R' is an alkyl group containing 1 to 12 carbon atoms, an aryl group containing 6 to 12 carbon atoms, or hydrogen; or an organic group containing from 1 to 50 carbon atoms, preferably from 1 to 40 carbon atoms; m is an integer from 0 to 11; Y is a substituted or unsubstituted benzophenone group; and n is an integer from 2 to 12.

X can be a divalent group or a polyvalent group with three or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of Y, herein R", when present, are individually selected from alkyl, aryl, alkoxy, phenoxy, or alicylic groups containing from 1 to 24 carbon atoms, or halides. Each benzophenone moiety can have from 0 to 9 substituents.

Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene (BBP$^3$) and substituted tribenzoyl triphenylbenzene are especially preferred.

Another class of photoinitiators that is especially useful in the present invention includes long-wavelength UV-absorbers. These are defined as compounds that absorb UV light and have a wavelength of maximum absorption greater than about 350 nm.

Preferred long-wavelength UV-absorbers include, but are not limited to, 2,4,6-trimethylbenzoyldiphenylphosphine oxide (commercially available as Lucerin® TPO from BASF), ethyl-2,4,6-trimethylbenzoylphenylphosphinate (Lucerin® TPO-L, BASF) isopropylthioxanthone, and bis (2,4,6-trimethylbenzoyl)phenylphosphineoxide. (commercially available from Ciba as Irgacure 819). Other preferred long-wavelength UV-absorbers comprise mixtures of different compounds. For example, a mixture of 25 wt % bis(2,6-dimethoxybenzoyl)-2,4,4-trimethyl pentylphosphineoxide with 75 wt % 2-hydroxy-2-methyl-1-phenyl-propan-1-one (Irgacure 1700, Ciba) or a mixture of 50 wt % 2,4,6-trimethylbenzoyl-diphenyl-phosphineoxide with 50 wt % 2-hydroxy-2-methyl-1-phenyl-propan-1-one (Irgacure 4265, Ciba) may be used.

Each photoinitiator has a wavelength of maximum absorption. The wavelength of maximum absorption is defined as the wavelength of ultraviolet radiation at which a substantially pure sample of the photoinitiator exhibits a greater spectrophotometric absorbance than at any other wavelength of ultraviolet radiation. Among the preferred photoinitiators described above, tribenzoyl triphenylbenzene (BBP$^3$) has a wavelength of maximum absorption of about 298 nm. 2,4,6-trimethylbenzoyldiphenylphosphine oxide has a wavelength of maximum absorption of about 365 nm. Bis(2,4,6-trimethylbenzoyl)phenylphosphineoxide has a wavelength of maximum absorption of about 375 nm.

The primary function of a photoinitiator is to enhance and facilitate the initiation of oxygen scavenging upon exposure to radiation. The amount of photoinitiator can vary. In many instances, the amount will depend on the oxidizable compounds used, the wavelength and intensity of UV radiation used, the nature and amount of antioxidants used, the desired scavenging rate, the temperature, and the initial oxygen concentration, as well as the type of photoinitiator used. The amount of photoinitiator also depends on how the scavenging component is used. For instance, if the photoinitiator-containing component is placed underneath a layer which is somewhat opaque to the radiation used, or is less permeable to oxygen, more photoinitiator may be needed. For most purposes, however, the amount of photoinitiator, when used, will be in the range of 0.01 to 10% by weight of the total oxygen scavenging layer.

The oxygen scavenging angular preformed packaging article can comprise a structural polymer. Such structural polymers preferably are thermoplastic and render the oxygen scavenging layer and/or any additional layers in which they are present more adaptable for use in a packaging article. Suitable structural polymers include, but are not limited to, polyethylene, low density polyethylene, very low density polyethylene, ultra-low density polyethylene, high density polyethylene, polyethylene terephthalaite (PET), polyvinyl chloride, and ethylene copolymers such as ethylene-vinyl acetate, ethylene-alkyl (meth)acrylates, ethylene-(meth)acrylic acid, and ethylene-(meth)acrylic acid ionomers. In angular preformed articles, such as beverage containers, PET is often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer that is incompatible with the oxidizable organic compound.

When one or more structural polymers are used, those polymers can comprise, in total, as much as 99% by weight of the oxygen scavenging layer. These one or more structural polymers, when used, may comprise as much as 100% by weight of any additional layers that may be present in the packaging article.

Preferably, the oxygen scavenging layer, or at least one additional layer of a packaging article comprising the oxygen scavenging layer, comprises a transition metal catalyst. The transition metal catalyst accelerates the rate of oxygen scavenging. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, stearate, palmitate, 2-ethylhexanoate, neodecanoate or naphthenate. Preferably, the salt, the transition metal, and the counterion are either on the U.S. Food and Drug Administration GRAS (generally regarded as safe) list, or exhibit substantially no migration from the packaging article to the product (i.e. less than 50 ppb in edible dietary intake (EDI)). Particularly preferable salts include cobalt oleate, cobalt stearate, and cobalt neodecanoate. The metal salt may also be an ionomer, in which case a polymeric counterion is employed. Such ionomers are well known in the art.

Typically, the amount of transition metal catalyst may range from 0.001 to 1% (10 to 10,000 ppm) of the oxidizable organic compound, based on the metal content only (excluding ligands, counterions, etc.). The transition metal catalyst can be formed in the oxygen scavenging layer or in a layer adjacent to the oxygen scavenging layer. In the event the amount of transition metal catalyst is less than 1%, it follows that the oxidizable organic compound, and any structural polymer or additives, will comprise substantially all of the scavenging component, i.e. more than 99% as indicated above for the oxidizable organic compound.

Antioxidants may be used with this invention to control scavenging initiation. An antioxidant as defined herein is a material which inhibits oxidative degradation or cross-linking of polymers. Typically, antioxidants are added to facilitate the processing of polymeric materials or prolong their useful lifetime. In relation to this. invention, such additives prolong the induction period for oxygen scavenging in the absence of irradiation. When it is desired to commence oxygen scavenging by the angular preformed packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E, and tetra-bismethylene 3-(3,5-ditertbutyl-4-hydroxyphenyl)-propionate methane are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight. However, additional amounts of antioxidant may also be added if it is desired to tailor the induction period as described above.

Other additives which can be included in the oxygen scavenging layer or any additional layers include, but are not necessarily limited to, fillers, pigments, dyestuffs, stabilizers, processing aids, plasticizers, fire retardants, and anti-fog agents, among others. Any other additives employed normally will not comprise more than 10% by weight of the scavenging layer or an additional layer, with preferable amounts being less than 5% by weight of the scavenging layer or additional layer.

To prepare oxygen scavenging layers and articles, the desired components thereof can be melt-blended at a temperature from about 50° C. to about 300° C. However, alternatives, such as the use of a solvent followed by evaporation, can be employed. The blending may immediately precede the formation of the finished article or preform or precede the formation of a feedstock or masterbatch for later use in the production of finished angular preformed packaging articles. When the blended composition is used to make an oxygen scavenging layer or an angular preformed packaging article, (co)extrusion, solvent casting, injection molding, stretch blow molding, orientation, thermoforming, extrusion coating, coating and curing, lamination, or combinations thereof would typically follow the blending.

The amounts of the components used in the oxygen scavenging layers or packaging articles have an effect on the efficiency of oxygen scavenging. Thus, the amounts of oxidizable organic compound, transition metal catalyst, and any photoinitiator, antioxidant, structural polymers and additives, can vary depending on the article and its end use.

For instance, the primary function of an oxidizable organic compound in the oxygen scavenging layer is to react irreversibly with oxygen during the scavenging process, while the primary function of the transition metal catalyst is to facilitate this process. Thus, to a large extent, the amount of oxidizable organic compound will affect the oxygen capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

Methods of the present invention comprise exposing an angular preformed packaging article comprised of an oxygen scavenging layer to UV radiation in order to initiate oxygen scavenging. This exposure can take place either before or after the bottom of the angular preformed packaging article (e.g., a gable top carton) has been formed, depending on the system or apparatus that is being used. To "initiate oxygen scavenging" is defined herein as significantly reducing (i.e. reducing by at least about 20%) the induction period of oxygen scavenging in the oxygen scavenging layer. As indicated above, the induction period is the period of time before the scavenging composition exhibits useful scavenging properties. Also, for compositions, layers, and articles for which the induction period in the absence of radiation is not known, the exposure of the composition, layer, or article to radiation will be referred to as initiation of oxygen scavenging.

While the mechanism by which oxygen scavenging is initiated is not known, it is believed, without being bound by theory, that one or more of the following occurs when the oxygen scavenger layer is exposed to radiation: (a) substantial depletion of any antioxidant or antioxidants, if present, thus allowing oxidation to proceed; (b) a substantial increase in free radical and/or peroxide species present in the system, despite the inhibiting effect of any antioxidant(s) if present or remaining; or (c) redox catalytic activity on the transition metal catalyst through a change in the metal's oxidation state or its configuration of ligands, thus increasing the scavenging rate of the system.

In at least one embodiment, the radiation used in this method is ultraviolet (UV) radiation having a wavelength substantially the same as the wavelength of maximum absorption of the photoinitiator.

If the photoinitiator is BBP[3], which has a wavelength of maximum absorption of 298 nm, the wavelength of UV is from about 280 nm to about 320 nm, preferably about 298 nm. A VIP 308 UV lamp (Fusion Excimer; peak wavelength about 300 nm) can provide this wavelength range. If the photoinitiator is 2,4,6-trimethylbenzoyldiphenylphosphine oxide, which has a wavelength of maximum absorption of about 365 nm, the wavelength of UV is from about 350 nm to about 380 nm, preferably about 365 nm. If the photoinitiator is bis(2,4,6-trimethylbenzoyl)phenylphosphineoxide, which has a wavelength of maximum absorption of about 375 nm, the wavelength of UV is from about 350 nm to about 400 nm, preferably about 375 nm.

Use of UV with a wavelength substantially the same as the wavelength of maximum absorption of the photoinitiator used in the composition has the advantage of allowing maximum harvesting of UV energy by the photoinitiator. As a result, it may be possible to use less photoinitiator than would be required for a packaging article initiated at other, oftentimes shorter, UV wavelengths known in the art.

Alternatively, if the amount of photoinitiator in the packaging article is about the same as that used in packaging articles known in the art, the dosage of UV energy (in mJ) required to initiate oxygen scavenging will be reduced relative to that known in the art. As a result, either the intensity of UV (in mJ/s) or the duration of exposure to UV (in s) can be reduced relative to that known in the art. It will often be desirable to reduce the duration of exposure, in order to maximize the throughput of initiated packaging articles on a filling line.

When the oxygen scavenging layer, or any additional layer between the oxygen scavenging layer and the hollow interior of the packaging article is comprised of one or more materials that are wholly or partially opaque to certain wavelengths of UV light, it is necessary to adjust the wavelength of the UV radiation accordingly. For example, if the oxygen scavenging layer or another layer interior to the oxygen scavenging layer comprises PET (polyethylene terephthalate), the UV radiation used in the initiating step is ultraviolet radiation with a wavelength of about 320 nm to about 400 nm, preferably about 350 nm to about 400 nm, more preferably about 360 nm to about 370 nm, and most preferably about 365 nm. These wavelengths can be provided by lamps such as the VIP 403 (Fusion Excimer; peak wavelength of about 403 nm) or a medium pressure mercury lamp (peak wavelength about 365 nm). PET is opaque to UV radiation with a wavelength less than about 320 nm.

In addition to applicability to layers comprising PET, use of UV radiation in this wavelength range has a number of advantages over use of UV radiation at shorter wavelengths, e.g. less than about 300 nm. First, intense UV radiation in this wavelength range is readily produced by inexpensive UV lamps, and does not require a special UV lamp designed for greater output at lower wavelengths. Second, UV radiation in this wavelength range can be safer, in terms of both short-term and long-term exposure, for workers. In particular, the preferred UV radiation of the present invention can be less harmful than UV radiation of certain shorter wavelengths that have been used in some known photoinitiation methods. (For example, 280 nm, 254 nm, and 185 nm are peak absorption wavelengths for proteins, RNA, and DNA, respectively. UV radiation of 185 nm wavelength can also generate ozone from free oxygen molecules exposed to it.) Third, UV radiation in this wavelength range is less energetic than UV at shorter wavelengths; as a result, there is a lower probability that the longer-wavelength UV will be able to disrupt carbon-carbon bonds in the oxidizable organic compound and other polymers present in the packaging article. As a result, longer-wavelength UV will cause less fragmentation of polymers in the packaging article, which will minimize the formation of fragments that can migrate into the stored product and thereby produce an undesirable odor or off-taste and/or that can weaken the polymeric structures of the packaging article.

UV radiation used in the present invention preferably has a wavelength of at least about 280 nm and may be generated by a single UV radiation source or by multiple UV radiation sources. A UV radiation source should be selected that generates about the desired wavelength of UV radiation. It is preferred that the UV radiation source generates UV radiation of a wavelength optimal for photoinitiation, both in its ability to penetrate to the oxygen scavenging layer and in its ability to be absorbed by the photoinitiator. Examples of UV radiation sources that might be used include Fusion excimer lamps and medium pressure mercury lamps. Such UV radiation sources are available from PurePulse Technologies, ACT Spectral, Inc., and Aetek among others. The UV radiation source can emanate radiation at the packaging article directly or the UV radiation source can be comprised of reflected UV radiation. The length of UV radiation exposure of the interior surface of the packaging article should be chosen to be sufficient to achieve the desired level of oxygen scavenging initiation in the packaging article.

In addition to initiating oxygen scavenging, the UV radiation exposure of the interior of the packaging article may be such as to sterilize the interior surfaces (especially when the wavelength is about 280 nm to about 300 nm). If sterilization of the interior surfaces of the oxygen scavenging packaging article is an objective, the duration and dosage of UV radiation should be selected to be sufficient to both initiate oxygen scavenging and sterilize the interior surfaces of the container.

UV treatment of the oxygen scavenging article may be further combined with wetting of the interior surfaces of the packaging article with hydrogen peroxide, provided that the composition and intended use of the packaging article are compatible with such hydrogen peroxide treatment. This may serve two purposes: (1) to improve the efficiency of initiation of oxygen scavenging in the packaging article and (2) to help in sterilization of the interior surfaces of the packaging article. Wetting the surfaces of certain types of packaging articles with hydrogen peroxide prior to UV radiation exposure can improve sterilization of the treated surfaces.

Wetting of the interior surfaces would involve application of a solution of hydrogen peroxide onto the interior surface of the packaging article. "Wetting," as used herein, refers to any method of wetting the surface with the solution. A surface to which such a solution has been applied will be referred to as "wetted." Typically, wetting involves spraying the solution through a spray nozzle to form a mist that will uniformly wet the surface. This provides uniform distribution of a sufficiently high density of the solution onto the surface, and can be performed quickly and conveniently during processing on an assembly line. However, other techniques of wetting the surface will be apparent, such as immersing the packaging article in a bath of the solution.

The solution is typically an aqueous solution comprising hydrogen peroxide. Other additives can be included in the solution, provided they do not interfere with either the ability of the hydrogen peroxide to initiate oxygen scavenging and/or to have an effect on sterilization, or the functional parameters (oxygen scavenging, strength, food contact etc.) of the packaging article.

After the interior surface of the packaging article has been wetted with the solution, it is preferred that the surface be dried, wherein water is removed from the solution on the interior surface of the packaging article, such as by evaporation under warm air. Such a surface from which water or other solvent has been removed, but hydrogen peroxide has not, is within the scope of "wetted" as defined above.

After the drying step, if any, oxygen scavenging or both oxygen scavenging and sterilization can be initiated by exposing the surface to UV radiation. Even if drying does not occur, the efficiency of initiation may depend to some extent on the interval between wetting the surface and subsequent exposure to the initiating agent. Optimizing the efficiency of initiation by altering the interval is within the scope of routine experimentation by one of ordinary skill in the art. Thus, wetting of the interior surfaces of the packaging article with a hydrogen peroxide solution might occur while the packaging article is in the chamber comprising the UV radiation source or prior to its entry into the chamber, depending on the length of time required between wetting and UV exposure for initiation to be effective.

Though not to be bound by theory, it is believed that for use in initiation, hydrogen peroxide will penetrate the packaging article and may impregnate the oxygen scavenging layer. The UV radiation exposure is believed to function to break down the hydrogen peroxide which has impregnated the oxygen scavenging layer into hydroxide radicals, which then have one or more of the following fates: consumption of any antioxidants present in the packaging article in proximity to the oxygen scavenging layer, transfer of electrons to or from the transition metal oxidation catalyst, attack on the oxygen scavenging polymer directly to bring it into a state that reacts readily with oxygen, among others, or a combination of these or other fates. Regardless of the mechanism, after initiation, oxygen can readily react with the oxidizable moieties of the oxygen scavenging polymer.

The intensity and exposure duration of the UV radiation are selected so as to provide a sufficiently large dosage of energy to the wetted surface of the packaging article to initiate oxygen scavenging or to initiate oxygen scavenging and to cause sterilization of the surface. The dosage of UV required will vary depending on the concentration and amount of hydrogen peroxide solution present on the wetted surface, the packaging article, the oxygen scavenging polymer, the presence and quantity of transition metal salts, antioxidants, and other additives in the packaging article, and other parameters apparent to one of ordinary skill in the art. Furthermore, if initiation is the primary objective, then the wavelength of UV radiation should be selected based on the composition of the packaging article (to be both penetrating and absorbed by the photoinitiator). However, for the combined purposes of initiation of oxygen scavenging and sterilization, the wavelength of UV radiation should be selected to achieve both as efficiently as possible.

The method of oxygen scavenging initiation in a packaging. article by UV radiation exposure of its interior surfaces may be combined with other methods of packaging sterilization. For example, chemical, heat, steam or irradiation (e.g. gamma) methods may be used to sterilize the interior surfaces of the packaging article. Such sterilization may occur during the time the packaging article is in the chamber comprising the UV radiation source, before its entry into the chamber, or after its exit from the chamber. Sterilization should occur after the bottom of the packaging article has been formed.

Furthermore, the packaging article may be exposed to a heat source while in the chamber comprising the UV radiation source that maintains its temperature between about 20° C. to about 50° C. If the packaging article is to be used in packaging food (e.g. meat), depending on the type of food, the ambient temperature within the packaging facility may be maintained at a temperature less than about 25° C., thus causing the temperature of the packaging article to be relatively low. Low temperature can be inhibitory to initiation of oxygen scavenging, and by maintaining the temperature of the packaging article at a point between about 20° C. to about 50° C., the efficiency of initiation of oxygen scavenging can be greatly improved, depending on the photoinitiator present in the packaging article.

An oxygen scavenging initiation system of the present invention can comprise a packaging article that comprises sidewalls defining a hollow interior, the sidewalls having an inner surface, wherein the sidewalls comprise an oxygen scavenging layer; conveying apparatus for moving the packaging article into a chamber that comprises a UV exposure apparatus that emits UV radiation of at least about 280 nm; and a mechanism for moving at least one of the packaging article or the UV exposure apparatus relative to the other, such that at least a part of the UV exposure apparatus is positioned in the hollow interior of the packaging article. This system can at least in some circumstance achieve more uniform activation of the entire oxygen scavenging layer in a packaging article than prior systems, because it can bring the oxygen scavenging layer and the UV radiation source into the necessary proximity to achieve relatively uniform UV exposure of the oxygen scavenging layer.

It is preferable to expose the oxygen scavenger to at least 0.1 J per gram of scavenging component. A typical amount of exposure is in the range of 0.5 to 10 J pet gram. The radiation exposure is preferably conducted in the presence of oxygen. The duration of exposure depends on several factors including, but not limited to, the amount and type of photoinitiator present, thickness of the layers to be exposed, amount of any antioxidant present, and the wavelength and intensity of the UV source.

When using oxygen scavenging layers or articles, the exposure to radiation can be during or after the layer or article is prepared. If the resulting layer or article is to be used to package an oxygen sensitive product, exposure can be just prior to, during, or after packaging. It can be exposed to UV radiation before or after the bottom of the packaging article has been formed. However, in any event, UV exposure should take place prior to using the layer or article as an oxygen scavenger. Preferably, UV initiation of oxygen scavenging occurs just before the packaging article is filled.

In certain embodiments of the invention, a useful oxygen scavenging rate can be as low as 0.05 cc $O_2$ per gram of oxidizable organic compound in the scavenging component per day in air at 25° C. and 1 atmosphere pressure. Certain oxygen scavenging layers, e.g. those containing oxidizable organic compounds with a polymeric backbone, cyclic olefinic pendant groups, and linking groups linking the backbone with the pendant groups, can exhibit rates of at least about 0.5 cc $O_2$ per gram per day, and in some cases about 5.0 cc $O_2$ per gram per day, or more.

When it is desired to use the methods or systems with an active oxygen barrier application, the initiated oxygen scavenging activity, in combination with any oxygen barriers, should create an overall oxygen transmission rate of less than about 1.0 cc $O_2$ per $m^2$ per day per atmosphere at 25° C. The oxygen scavenging capacity should be such that this transmission rate is not exceeded for at least two days, and preferably for a much longer period of time.

For many commercial applications, it is preferable that scavenging establish an internal oxygen level of less than 0.1% as soon as possible, preferably less than about four weeks.

Once scavenging has been initiated, the oxygen scavenging layer, or packaging article comprising the layer, should continue to scavenge oxygen until substantially all of its oxidizable sites have been consumed. In use, the oxygen capacity (the total amount of oxygen scavenged until substantially all of the oxidizable sites are consumed) required for a given application depends on: (1) the quantity of oxygen initially present in the package, (2) the rate of oxygen entry into the package in the absence of the scavenging property, and (3) the intended shelf life for the package.

When using oxidizable organic compounds comprising a polymeric backbone, cyclic olefinic pendant groups, and linking groups linking the backbone with the pendant groups, the oxygen scavenging capacity can be as low as 1 cc $O_2$ per g, but can be at high as 50 cc $O_2$ per g. When such compounds are in a layer, the layer will preferably have an oxygen scavenging capacity of at least 250 cc $O_2$ per $m^2$ per mil thickness, and more preferably at least 1200 cc $O_2$ per $m^2$ per mil thickness.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for initiation of oxygen scavenging in a packaging article, comprising the steps of:

providing an angular preformed packaging article that comprises sidewalls defining a hollow interior, the sidewalls having an inner surface, wherein the sidewalls comprise an oxygen scavenging layer;

moving the packaging article into a chamber that comprises a UV exposure apparatus;

moving at least one of the packaging article or the UV exposure apparatus relative to the other, such that at least a part of the UV exposure apparatus is positioned in the hollow interior of the packaging article; and emitting UV radiation of at least about 280 nm from the UV exposure apparatus such that the radiation contacts the inner surface of the sidewalls of the packaging article, in a dose sufficient to initiate oxygen scavenging in the oxygen scavenging layer.

2. The method of claim 1, wherein the UV exposure apparatus comprises a UV source and a member that is extendable and retractable, and wherein the member is extended to position the UV source in the hollow interior of the packaging article, wherein the source emits UV radiation toward the inner surface of the sidewalls.

3. The method of claim 1, wherein the UV exposure apparatus comprises a UV source and a lift mechanism, and wherein the lift mechanism moves the packaging article such that at least a part of the UV source is positioned in the hollow interior of the packaging article, wherein the source emits UV radiation toward the inner surface of the sidewalls.

4. The. method of claim 1, wherein the UV exposure apparatus comprises a UV source and a reflector apparatus for reflecting UV radiation emitted by the UV source toward the inner surface of the packaging article, the reflector apparatus being retractable and extendable, and wherein the reflector apparatus is extended to position the reflector in the hollow interior of the packaging article, wherein the source emits UV radiation toward the reflector which is reflected toward the inner surface of the sidewalls.

5. The method of claim 1, wherein the UV exposure apparatus comprises a UV source, a reflector apparatus for reflecting UV radiation emitted by the UV source toward the inner surface of the packaging article, and a lift mechanism for moving the packaging article relative to the reflector such that at least a part of the reflector is positioned in the hollow interior of the packaging article, wherein the source emits UV radiation from the UV source which is reflected by the reflector toward the inner surface of the packaging article.

6. The method of claim 1, further comprising sterilizing the hollow interior of the packaging article.

7. The method of claim 6, wherein the UV radiation exposure is sufficient to both initiate oxygen scavenging and to sterilize the hollow interior of the packaging article.

8. The method of claim 1, wherein the packaging article further comprises a bottom wall comprising an oxygen scavenging layer.

9. The method of claim 1, wherein the oxygen scavenging layer comprises an oxidizable organic compound and a photoinitiator.

10. The method of claim 9, wherein the oxidizable organic compound comprises a substantially saturated hydrocarbon polymeric backbone and at least one cyclic olefinic pendant group.

11. The method of claim 10, wherein the polymeric backbone is ethylenic and the cyclic olefinic pendant group has the structure (I):

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

12. The method of claim 11, wherein the oxidizable organic compound is ethylene-vinyl cyclohexene copolymer (EVCH).

13. The method of claim 11, wherein the oxidizable organic compound further comprises a linking group linking the polymeric backbone and the cyclic olefinic pendant group, wherein the linking group is selected from:

—O—$(CHR)_n$—; —(C=O) O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—;

wherein R is hydrogen, methyl, ethyl, propyl, or butyl; and n is an integer from 1 to 12, inclusive.

14. The method of claim 13, wherein the oxidizable organic compound is ethylene/methyl acrylate/cyclohexenyl methyl acry late terpolymer (EMCM) or cyclohexenylmethyl acrylate (CHAA) homopolymer.

15. The method of claim 9, wherein the photoinitiator is selected from benzophenone derivatives containing at least two benzophenone moieties and having the formula:

$$X_m(Y)_n$$

wherein X is a bridging group selected from sulfur; oxygen; carbonyl; —$SiR_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms;

m is an integer from 0 to 11;

Y is a substituted or unsubstituted benzophenone group; and n is an integer from 2 to 12.

16. The method of claim 15, wherein the photoinitiator is selected from tribenzoyl triphenylbenzene ($BBP^3$), substituted $BBP^3$, dibenzoyl biphenyl, substituted dibenzoyl biphenyl, benzoylated terphenyl, substituted benzoylated terphenyl, benzoylated styrene oligomer, or substituted benzoylated styrene oligomer.

17. The method of claim 16, wherein the photoinitiator is $BBP^3$ and the wavelength of UV radiation is about 280 nm to about 320 nm.

18. The method of claim 9, wherein the photoinitiator is a long-wavelength UV absorber.

19. The method of claim 17, wherein the photoinitiator is selected from the group consisting of 2,4,6-trimethylbenzoyldiphenylphosphine oxide, ethyl-2,4,6- trimethylbenzoylphenylphosphinate, isopropylthioxanthone, and bis(2,4,6-trimethylbenzoyl)phenylphosphineoxide.

20. The method of claim 19, wherein the photoinitiator is 2,4,6-trimethylbenzoyldiphenylphosphine oxide and the wavelength of UV radiation is about 350 nm to about 380nm.

21. The method of claim 19, wherein the photoinitiator is bis(2,4,6-trimethylbenzoyl)phenylphosphineoxide and the wavelength of UV radiation is about 350 nm to about 400 nm.

22. The method of claim 1, wherein the oxygen scavenging layer comprises a structural polymer.

23. The method of claim 22, wherein the structural polymer is opaque to certain wavelengths of UV radiation.

24. The method of claim 23, wherein the UV radiation emitted by the UV exposure apparatus can penetrate the structural polymer.

25. The method of claim 22, wherein the structural polymer comprises at least one of the group consisting of polyethylene, polyethylene terephthalate (PET), polyvinyl chloride, ethylene-vinyl acetate, ethylene-alkyl (meth) acrylates, ethylene-(meth)acrylic acid, and ethylene-(meth) acrylic acid ionomer.

26. The method of claim 25, wherein the structural polymer comprises PET and the UV radiation comprises a wavelength of at least about 320 nm.

27. The method of claim 1, wherein the oxygen scavenging layer forms the interior surface of the packaging article.

28. The method of claim 27, wherein the oxygen scavenging layer can be activated by UV radiation comprising a wavelength of at least 280 nm.

29. The method of claim 1, wherein the packaging article further comprises at least one additional layer.

30. The method of claim 29, wherein the at least one additional layer is located between the oxygen scavenging layer and the hollow interior of the packaging article.

31. The method of claim 30, wherein the at least one additional layer can be penetrated by UV radiation comprising a wavelength of at least about 280 nm.

32. The method of claim 1, wherein the packaging article is exposed to a heat source sufficient to maintain its temperature between about 20° C. to about 50° C. while it is in the chamber.

33. An oxygen scavenging initiation system, comprising:
an angular packaging article that comprises sidewalls defining a hollow interior, the sidewalls having an inner surface, wherein the sidewalls comprise an oxygen scavenging layer;
a conveying apparatus for moving the packaging article into a chamber that comprises a UV exposure apparatus that emits UV radiation of at least about 280 nm; and
a mechanism for moving at least one of the packaging article or the UV exposure apparatus relative to the other, such that at least a part of the UV exposure apparatus is positioned in the hollow interior of the packaging article.

34. The system of claim 33, wherein the UV exposure apparatus comprises a UV source and a member that is extendable and retractable for positioning the UV source in the hollow interior of the packaging article, and for retracting the UV source from the hollow interior of the packaging article.

35. The system of claim 33, wherein the UV exposure apparatus comprises a UV source and a lift mechanism for lifting the packaging article such that at least a part of the UV source is positioned in the hollow interior of the packaging article.

36. The system of claim 33, wherein the UV exposure apparatus comprises a UV source and a reflector apparatus for reflecting UV radiation emitted by the UV source toward the inner surface of the packaging article, the reflector apparatus being retractable and extendable for positioning the reflector in the hollow interior of the packaging article and for retracting the reflector from the hollow interior of the packaging article.

37. The system of claim 33, wherein the UV exposure apparatus comprises a UV source, a reflector apparatus for reflecting UV radiation emitted by the UV source toward the inner surface of the packaging article, and a lift mechanism for moving the packaging article relative to the reflector such that at least a part of the reflector is positioned in the hollow interior of the packaging article, and UV radiation from the UV source is reflected by the reflector toward the inner surface of the packaging article.

38. The system of claim 33, wherein the UV radiation source emits UV radiation sufficient to both initiate oxygen scavenging and to sterilize the hollow interior of the packaging article.

39. The system of claim 33, further comprising a sterilization apparatus for sterilizing the hollow interior of the packaging article.

40. The system of claim 33, wherein the packaging article is exposed to UV radiation for a fixed amount of time.

41. The system of claim 33, wherein the packaging article further comprises a bottom wall comprising an oxygen scavenging layer.

42. The system of claim 41, wherein the bottom wall of the packaging article is formed before UV radiation exposure.

43. The system of claim 41, wherein the bottom wall of the packaging article is formed.after UV radiation exposure.

44. The system of claim 33, wherein the oxygen scavenging layer comprises an oxidizable organic compound and a photoinitiator.

45. The system of claim 44, wherein the oxidizable organic compound comprises a substantially saturated hydrocarbon polymeric backbone and at least one cyclic olefinic pendant group.

46. The system of claim 45, wherein the polymeric backbone is ethylenic and the cyclic olefinic pendant group has the structure (I):

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

47. The system of claim 46, wherein the oxidizable organic compound is ethylene-vinyl cyclohexene copolymer (EVCH).

48. The system of claim 46, wherein the oxidizable organic compound further comprises a linking group linking the polymeric backbone and the cyclic olefinic pendant group, wherein the linking group is selected from:
—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—;

wherein R is hydrogen, methyl, ethyl, propyl, or butyl; and n is an integer from 1 to 12, inclusive.

49. The system of claim 48, wherein the oxidizable organic compound is ethylene/methyl acrylate/cyclohexenyl methyl acrylate terpolymer (EMCM) or cyclohexenylmethyl acrylate (CHAA) homopolymer.

50. The system of claim 44, wherein the photoinitiator is selected from benzophenone derivatives containing at least two benzophenone moieties and having the formula:

wherein X is a bridging group selected from sulfur; oxygen; carbonyl; —SiR$_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms;

m is an integer from 0 to 11;

Y is a substituted or unsubstituted benzophenone group; and n is an integer from 2 to 12.

51. The system of claim 50, wherein the photoinitiator is selected from tribenzoyl triphenylbenzene (BBP$^3$), substituted BBP$^3$, dibenzoyl biphenyl, substituted dibenzoyl biphenyl, benzoylated terphenyl, substituted benzoylated terphenyl, benzoylated styrene oligomer, or substituted benzoylated styrene oligomer.

52. The system of claim 51, wherein the photoinitiator is BBP$^3$ and the wavelength of UV radiation is about 280 nm to about 320 nm.

53. The system of claim 44, wherein the photoinitiator is a long-wavelength UV-absorber.

54. The system of claim 53, wherein the photoinitiator is selected from the group consisting of 2,4,6-trimethylbenzoyldiphenylphosphine oxide, ethyl-2,4,6-trimethylbenzoylphenylphosphinate, isopropylthioxanthone, and bis(2,4,6-trimethylbenzoyl)phenylphosphineoxide.

55. The system of claim 54, wherein the photoinitiator is 2,4,6-trimethylbenzoyldiphenylphosphine oxide and the wavelength of UV radiation is about 350 nm to about 380 nm.

56. The system of claim 54, wherein the photoinitiator is bis(2,4,6-trimethylbenzoyl)phenylphosphineoxide and the wavelength of UV radiation is about 350 nm to about 400 nm.

57. The system of claim 33, wherein the oxygen scavenging layer comprises a structural polymer.

58. The system of claim 57, wherein the structural polymer is opaque to certain wavelengths of UV radiation.

59. The system of claim 58, wherein the UV radiation emitted by the UV exposure apparatus can penetrate the structural polymer.

60. The system of claim 57, wherein the structural polymer comprises at least one of the following group consisting of polyethylene, polyethylene terephthalate (PET), polyvinyl chloride, ethylene-vinyl acetate, ethylene-alkyl(meth) acrylates, ethylene-(meth)acrylic acid, and ethylene-(meth) acrylic acid ionomer.

61. The system of claim 60, wherein the structural polymer comprises PET and the UV radiation comprising a wavelength of at least about 320 nm.

62. The system of claim 33, wherein the oxygen scavenging layer forms the interior surface of the packaging article.

63. The system of claim 62, wherein the oxygen scavenging layer can be activated by UV radiation comprising a wavelength of at least about 280 nm.

64. The system of claim 33, wherein packaging article further comprises at least one additional layer.

65. The system of claim 64, wherein the at least one additional layer is located between the oxygen scavenging layer and the hollow interior of the packaging article.

66. The system of claim 65, wherein the at least one additional layer can be penetrated by UV radiation comprising a wavelength of at least 280 nm.

67. The system of claim 33, wherein the packaging article is exposed to a heat source sufficient to maintain its temperature between about 20° C. to about 50° C. while it is in the chamber.

* * * * *

UNITED STATES PATENT AND TRADEMARK OFFICE
CERTIFICATE OF CORRECTION

PATENT NO. : 6,517,776 B1 Page 1 of 1
DATED : February 11, 2003
INVENTOR(S) : Brad D. Rodgers, Ta Yen Ching and Gary D. Jerdee It is certified that error appears in the above-identified patent and that said Letters Patent is hereby corrected as shown below:

<u>Column 20,</u>
Line 23, delete "—(C=O) O—(CHR)$_n$—;" and insert -- —(C=O)—O—(CHR)$_n$—; --.

Signed and Sealed this

First Day of July, 2003

JAMES E. ROGAN
*Director of the United States Patent and Trademark Office*